United States Patent Office 3,769,204
Patented Oct. 30, 1973

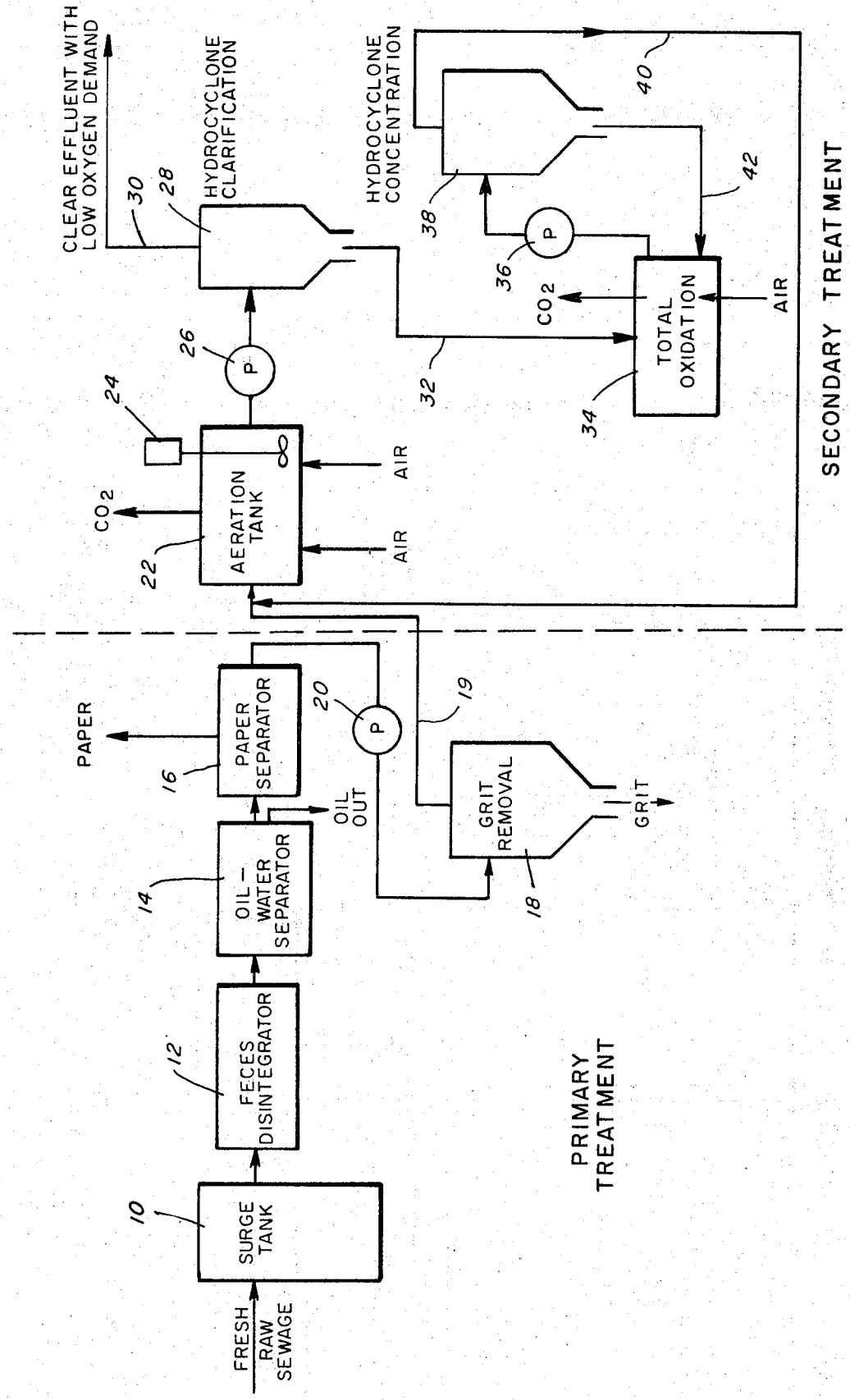

3,769,204
DISPERSED GROWTH BIOLOGICAL SEWAGE
TREATMENT PROCESS
Don F. Kincannon, L. Andrew Macuila, and William G.
Tiederman, Jr., Stillwater, Okla., assignors to Oklahoma
State University, Stillwater, Okla.
Filed Apr. 19, 1972, Ser. No. 245,443
Int. Cl. C02c 1/06
U.S. Cl. 210—6        5 Claims

ABSTRACT OF THE DISCLOSURE

A dispersed growth biological secondary sewage treatment process for removing dissolved organic material and suspended solid material from sewage including metabolizing the dispersed biological solids to yield new cell material, carbon dioxide, and water, subjecting the metabolized medium to hydroclonic forces to separate the same into clean effluent and concentrated biological solids, and total oxidizing the concentrated biological solids in a saturation environment.

BACKGROUND, SUMMARY AND OBJECT OF THE INVENTION

In the present technology of sewage treatment, a majority of the waste-water processes utilize large gravity clarifiers to separate solids from liquids. This is particularly true in secondary treatment. Clarifiers of this type must be large because long settling times are needed to gravitationally separate biological solids from a liquid which normally has only a slightly lower density.

In addition, when biological solids are in a completely dispersed state, they cannot be separated from water by gravitational forces. In order to achieve such separation the utilization of centrifugal forces has been found to be highly desirable. The centrifugal acceleration developed in a well designed hydroclone is typically several thousand times gravity and therefore it has been learned that a hydroclone can be used to clarify a completely dispersed biological system.

There are several advantages to the utilization of the dispersed biological sewage treatment system. This type system has particular advantages as applied to salt water sewage systems since salt water biological systems will not easily flocculate and therefore tend to remain dispersed.

Another advantage of the dispersed biological system is that it is typically younger and faster growing than older biological populations capable of flocculation and gravitational separation. Since the dispersed system is faster growing, the detention times are shorter. In addition, since the biological growth rates are more rapid in the dispersed system, smaller, less expensive equipment will handle an equivalent amount of waste water compared to treatment by gravity separation. Another advantage of a dispersed biological system is that the kinetics of this system can be described mathematically. Thus, the dispersed system can be accurately scaled to any required size, minimizing costly experimentation normally required in gravity systems and the additional safety factor capacity. Still another advantage of the dispersed biological system is that approximately three days after it is started it will operate at efficiencies of approximately 90%. A typical activated sludge reactor would require weeks to reach the same operating effectiveness.

It is an object of this invention to provide a dispersed biological sewage treatment system having the advantages above enumerated.

More particularly, an object of this invention is to provide a dispersed biological sewage treatment system characterized by the provision of hydroclone separation steps in which the dispersed biological sewage is subjected to centrifugal forces many times that of gravity to more efficiently and effectively separate dispersed biological material from the water effluent.

Another object of this invention is to provide a dispersed biological sewage treatment system which is capable of handling a given treatment capacity with minimized space and cost compared to gravity separation systems.

These general objects, as well as more specific objects, will be understood in the description and claims to follow, taken in conjunction with the attached drawing.

DESCRIPTION OF THE DRAWING

The drawing is a diagrammatic representation of a dispersed growth biological secondary sewage treatment process incorporating the novel concepts of this invention.

DETAILED DESCRIPTION

The dispersed growth biological sewage treatment process of this invention is intended for use in conjunction with a primary treatment system. The primary system itself forms no part of the invention, but as shown in FIG. 1 may typically include a surge tank which functions to balance the flow rates through the treatment facility; a feces disintegrator 12 to break up fresh raw sewage as received from the tank; an oil-water separator 14; a paper separator 16; and a grit removal station 18. The grit removal station may, if space permits, be in form of a gravity separator. However, if space is a premium, then the grit removal station 18 is more efficiently accomplished by use of a hydroclone or a series of hydroclones which removes the grit and other large suspended solids. A pump 20 will normally be employed to introduce the effluent into hydroclone 18 at a flow rate sufficient to obtain in the hydroclone the centrifugal forces necessary for the complete removal of the suspended solids (grit). The outflow from hydroclone 18 is passed by line 19 to the secondary treatment process which forms the essence of this invention.

The waste water leaving the primary treatment system enters an aeration tank 22. Here the dissolved and suspended organic material is metabolized to yield new cell material, carbon dioxide and water. In the aeration tank 12 the solids are preferably agitated, such as by means of stirrer 24, and oxidation is enhanced by the injection of either air or oxygen. Since the aeration tank maintains the organic material in a completely dispersed environment the new cell growth rate is much faster than in a clarifier or typical large capacity gravity settling tank.

Fluid is withdrawn from the aeration tank and, through pumps 26 is injected into a hydroclone clarifier 28. A percentage of the fluid flow outlet from aeration tank 22 is discharged from hydroclone 28 as clear effluent through outlet 30 and the balance, consisting of effluent concentrated with biological solid, is discharged from the hydroclone to outlet conduit 32. The concentrated biological solids are discharged into a total oxidation tank 34. In addition, the suspended particles discharged from grit removal hydroclone 18 are deposited into total oxidation 34.

The purpose of total oxidation tank 34 is to provide a starvation environment for the biological cells so that they will digest themselves. This is an important feature of this invention because it means that there will be no biological sludge dissolved from this system in contrast to typical waste-water treatment systems wherein the sludge is normally concentrated, dried and then either burned or trucked away. Air is injected into the total oxidation system and the new cell growth results in the production of water and carbon dioxide. The outflow from total oxidation tank 34 is injected by pump 36 into a hydroclone concentrator 38. The clear fluid outlet 40 from hydroclone concentrator 38 is recycled into aeration tank 22. The suspended biological material ejected in the hydroclone concentrator 38 is recycled through line 42 back into the total oxidation tank. Thus the only discharge from the system is that flowing through the clear effluent outlet 30. This clear effluent has low oxygen demand and is therefore a nonpollutant.

The unique combination of the hydroclone clarifier 28, the dispersed growth aeration tank 22, and the total oxidation tank 34 permits the fabrication and installation of a compact sewage treatment system suitable for use with fresh water or salt water and may be used on land or ships. The advantages of this system for use on ships are apparent. Since no gravity separation is required the space saving is substantial. In addition, this system permits the capacity of present sewage treatment plants on ships to be readily increased; it permits the design of more efficient and smaller aeration tanks; it eliminates the necessity for expensive sludge-handling equipment; it eliminates the need for large gravity clarifiers; and the short time required for start-up permits the system to be used as a mobile waste treatment facility.

While the systems described include the essential steps in the treatment process and the apparatus necessary for carrying out the process, it can be seen that additional or supplementary treatment processes can be employed and the specific arrangement and sequence of the steps may be varied in keeping with the essence of the invention.

Hydroclones, as used herein, mean devices which subject liquid effluent to high hydrocyclonic forces in an arrangement in which the heavier components are discharged at one outlet and the lighter components are discharged at another outlet.

Reference may be had to the following U.S. patents for a detailed description of the construction, design and operation of hydroclones of the type which may be employed in carrying out the present invention: No. 3,235,090, entitled, "Hydroclones," issued Feb. 15, 1966; No. 3,501,014, entitled, "Regenerative Hydroclone," issued Mar. 17, 1970; and No. 3,529,724, entitled "Hydroclone Filter," issued Sept. 22, 1970.

While the invention has been described with a certain degree of particularity it is manifest that many changes may be made in the details of construction and the arrangement of components without departing from the spirit and scope of this disclosure. It is understood that the invention is not limited to the specific embodiments set forth herein for purposes of exemplifying the invention, but is to be limited only by the scope of the attached claim or claims, including the full range of equivalency to which each element or step thereof is entitled.

We claim:

1. A dispersed growth biological secondary sewage treatment process for removing dissolved organic material and suspended organic material from sewage comprising the steps of:

metabolizing the dispersed biological solids to yield new cell material, carbon dioxide and water;
subjecting the metabolized medium to hydrocyclonic forces to separate the same into clean effluent and concentrated biological solids; and
total oxidizing the concentrated biological solids in a saturation environment.

2. A sewage treatment process according to claim 1 including:
recycling the outflow from the total oxidizing step back through the metabolizing step.

3. A sewage treatment process according to claim 1 including:
subjecting the outflow from the total oxidizing step to hydrocyclonic forces to separate the outflow into clear effluent and concentrated biological solids;
recycling the clear effluent to the metabolizing step; and
recycling the concentrated biological solids back to the total oxidizing step.

4. A dispersed growth biological secondary sewage treatment process for removing dissolved organic material and suspended organic material comprising the steps of:
discharging waste water having dispersed biological solids into a metabolizing tank;
injecting oxygen into said metabolizing tank to agitate the dispersed biological solids and increase the rate of metabolization;
injecting fluid outflow from the metabolizing tank into a hydroclone clarifier wherein the fluid is subjected to high centrifugal forces and separately discharging clean effluent and concentrated biological solids;
passing the concentrated biological solids to a total oxidation tank;
injecting oxygen into the total oxidation tank to speed total oxidation of the biological solids; and
recycling effluent outflow from the total oxidation tank back into the metabolizing tank.

5. A sewage treatment process according to claim 4 wherein the step of recycling effluent outflow from the total oxidation tank includes:
subjecting the outflow from the total oxidizing step to high centrifugal forces to separate the outflow into clear effluent and concentrated biological solids;
recycling the clear effluent to the metabolizing tank; and
recycling the concentrated biological solids back to said total oxidizing step.

References Cited

UNITED STATES PATENTS

| | | | |
|---|---|---|---|
| 2,227,851 | 1/1941 | Strezynski | 210—15 |
| 2,794,778 | 6/1957 | Vrignaud | 210—15 |
| 3,047,492 | 7/1962 | Gambrel | 210—7 |
| 3,180,824 | 4/1965 | Corey | 210—8 |

MICHAEL ROGERS, Primary Examiner

U.S. Cl. X.R.

210—8, 73, 152, 195, 201, 512

UNITED STATES PATENT OFFICE
CERTIFICATE OF CORRECTION

Patent No. 3,769,204　　　　Dated October 30, 1973

Inventor(s) Don F. Kincannon et al.

It is certified that error appears in the above-identified patent and that said Letters Patent are hereby corrected as shown below:

In the heading to the printed specification, line 4, "Andrew Macuila" should read -- Andrew Maciula --.

Signed and sealed this 3rd day of September 1974.

(SEAL)
Attest:

McCOY M. GIBSON, JR.　　　　　　C. MARSHALL DANN
Attesting Officer　　　　　　　　Commissioner of Patents